United States Patent
Hayashi et al.

(10) Patent No.: US 6,913,220 B2
(45) Date of Patent: Jul. 5, 2005

(54) BRAKING DEVICE FOR MAGNETIC TAPE APPARATUS

(75) Inventors: Ryuji Hayashi, Osaka (JP); Nobuyuki Okazaki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 127 days.

(21) Appl. No.: 10/658,152

(22) Filed: Sep. 9, 2003

(65) Prior Publication Data

US 2004/0079824 A1 Apr. 29, 2004

(30) Foreign Application Priority Data

Sep. 10, 2002 (JP) .................................. 2002-005736 U

(51) Int. Cl.⁷ .............................................. G11B 15/32
(52) U.S. Cl. .................................... 242/356.3; 360/96.3
(58) Field of Search ............................ 242/343, 356.3, 242/356.4, 357; 360/96.3, 96.4

(56) References Cited

U.S. PATENT DOCUMENTS 5,295,639 A * 3/1994 Kurokawa et al. ....... 242/356.3
5,788,175 A * 8/1998 Hwang ..................... 242/356.3
5,810,275 A * 9/1998 Yang ......................... 360/96.3
5,833,162 A * 11/1998 Jang ......................... 242/356.3
6,550,711 B2 * 4/2003 Sawai et al. ............. 242/356.3
2001/0042807 A1 * 11/2001 Sawai et al. ............... 360/96.3

FOREIGN PATENT DOCUMENTS

JP         P3-8160         1/1991
JP         P5-114199      5/1993

* cited by examiner

Primary Examiner—William A. Rivera
(74) Attorney, Agent, or Firm—Osha Liang LLP

(57) ABSTRACT

A braking device for an magnetic tape apparatus includes a switching unit for selectively transmitting the rotation of a capstan motor to a take-up reel table or to a supply reel table, a clutch for changing the switching unit to a slide rotation mode or to a direct-coupled rotation mode, a brake, a loading motor for driving the brake, and an end sensor. Based on a tape end detection signal produced during an operation in a fast forward mode, the capstan motor is rotated in reverse to permit the switching unit to select a second path, while the switching unit is maintained in the direct-coupled mode. Thereafter, the capstan motor is halted, and the loading motor is rotated to use the brake to halt the take-up reel table.

4 Claims, 4 Drawing Sheets

BRAKING DEVICE FOR MAGNETIC TAPE APPARATUS

BACKGROUND OF THE INVENTION

1. Field of the Invention

The present invention relates to a braking device for a magnetic tape apparatus, particularly to a braking device for halting the feeding of magnetic tape from a supply reel when the amount of magnetic tape remaining on the supply reel is reduced in a fast forward mode.

2. Description of the Related Art

Well known braking devices for magnetic tape apparatuses are disclosed in JP-A-3-8160 (conventional example 1) and JP-A-5-114199 (conventional example 2).

According to conventional example 1, various operating modes are selected depending on the position of a plate cam. In a fast forward mode, the plate cam renders a braking device inactive in accordance with an energization instruction provided for an electromagnet. When a tape end detector detects a terminal end of a tape, a detection signal is transmitted to a system controller. The system controller then simultaneously outputs an instruction to halt a capstan motor that is rotating a reel table and an instruction to stop the supply of power to the electromagnet. Accordingly, the capstan motor is halted, and the plate cam is displaced by a spring within a short period of time to thereby activate the braking device. This braking method is so-called a quick braking method.

According to conventional example 2, a braking unit is described in which the operating mode of a magnetic recording/reproducing apparatus is switched from a fast forward/fast rewind (FF/REW) mode to a stop (STOP) mode. The magnetic recording/reproducing apparatus according to conventional example 2 includes: a swing type idler gear for selectively switching a first path along which the rotational power produced by a capstan motor is transmitted by gears to a take-up reel table and a second path along which the rotational power produced by the capstan motor is transmitted by gears to a supply reel table; and a clutch for switching between a slide rotation mode during which the rotational speed of the idler gear is synchronized with the rotational speed of a capstan shaft that is limiting the speed at which a magnetic tape travels, and a direct-coupled rotation mode during which the idler gear is directly coupled with the capstan motor. In the fast forward (FF) mode, the clutch is maintained in the direct-coupled rotation mode, and the idler gear is shifted toward the first path to transmit the rotational driving force to the take-up reel table. When an instruction to halt the tape is issued in the fast forward mode, the capstan motor begins to rotate in reverse and the idler gear is shifted toward the second path while the clutch is maintained in the direct-coupled rotation mode.

According to this technique, when the capstan motor begins to rotate in reverse, the direction in which the idler gear rotates is changed and the idler gear is shifted to the second path. Therefore, since the idler gear engages with a gear provided on the supply reel table to prevent the idling rotation of the supply reel table, the quick brake method in conventional example 1 need not be employed. Further, a time period from the halt instruction is issued to rotate the capstan motor in reverse until the idler gear engages with the gear of the supply reel table can be set shorter than a breaking period required for pressing a brake band or a brake shoe against the supply reel table.

According to the quick brake method in conventional example 1, in the fast forward mode, the tape travel can be halted within a short period of time. However, there is a limit imposed on a reduction of a time period required to displace the plate cam when the braking device is changed from the inactive state to the active state. Also, since friction is used to halt the rotation of the supply reel table, the idling rotation of the table cannot be halted immediately when the braking device is activated. Therefore, in the case where the quick break method is employed to immediately halt the tape travel when the tape end detector detects the terminal end of the magnetic tape in the fast forward mode; there is a fear that a leader connected to the end of the tape will be halted immediately before reaching a rotation cylinder of a magnetic head and a boundary between the leader and the magnetic tape rubs and adversely affect the magnetic head.

On the other hand, according to conventional example 2, upon reception of a tape end detection instruction in the fast forward mode, the reverse rotation of the capstan motor is initiated to change the rotational direction of the idler gear, and the idler gear engages with the gear of the supply reel table to prevent the idling rotation of the supply reel table. Therefore, the idling rotation of the supply reel table can momentarily be halted. As a result, the problem in conventional example 1, in which the boundary between the end of the magnetic tape and the leader rubs and adversely affects the magnetic head, can be avoided.

However, in conventional example 2, there is no description about means for preventing magnetic tape discharge phenomenon which reactively occurs in the take-up reel table when the idler gear engages with the gear of the supply reel table and the idling rotation of the supply reel table is immediately halted, i.e., a phenomenon in which the take-up reel table is rotated in reverse in reaction to an extremely large tension force applied to the magnetic tape and the magnetic tape wound around the take-up reel table goes back when the rotation of the supply reel table is halted immediately.

Therefore, using the techniques described in conventional example 2, loosen of the magnetic tape, which can occur due to the magnetic tape discharge phenomenon, cannot be prevented. Further, no description is given of the timing whereat the direct-coupled mode of the idler gear is released. Thus, after the fast forward mode is changed to the stop mode, it is unknown what kind of means should be employed for changing the stop mode to a recording/reproducing mode at normal speed.

SUMMARY OF THE INVENTION

The present invention has been made to solve the above problems, and therefore one objective of the present invention is to provide a breaking device for a magnetic tape apparatus capable of stopping the magnetic tape travel before a boundary between a tape end and a leader reaches a magnetic head rotation cylinder by immediately engaging gears, as in conventional example 2, to halt the rotation of a supply reel table when a tape end (tape terminal end) is detected during the operation in the fast forward mode.

Another objective of the present invention is to provide a breaking device for a magnetic tape apparatus which regulates the timing at which a clutch is changed from a direct-coupled mode to a slide rotation mode and the timing for braking a take-up reel table, so that loosen of a magnetic tape due to magnetic tape discharge phenomenon occurring at the take-up reel table after the momentary halting of a supply reel table can be prevented, and so that a shift to the recording/reproducing mode at normal speed can be conducted smoothly.

A braking device for a magnetic tape apparatus according to one aspect of the invention includes: a switching unit for, as a rotational direction of a capstan motor is changed, selecting a first path along which a rotation of the capstan motor is transmitted through gears to a take-up reel table or a second path along which the rotation of the capstan motor is transmitted through gears to a supply reel table, the switching unit including a clutch having an output gear that transmits the rotation to the take-up reel table or to the supply reel table, the clutch switching the output gear between a slide rotation mode and a direct-coupled mode with respect to an input gear connected to the capstan motor; a brake for breaking the take-up reel table; a loading motor for driving the brake and loading a magnetic tape; and an end sensor for detecting a tape end of the magnetic tape.

With this configuration, as the rotational direction of the capstan motor is changed, the output gear of the switching unit transmits the rotation either to the take-up reel table or the supply reel table. In this case, when the output gear of the switching unit is changed by the clutch to the slide rotation mode with respect to the input gear, the output gear rotates more slowly than the input gear, while a rotation load is applied to the output gear. The slide rotation mode is employed when in the recording/reproducing mode at normal speed the rotational speed of the take-up reel table is to be synchronized with the rotation speed of the capstan shaft that regulates the speed at which the magnetic tape travels. Whereas, when the output gear of the switching unit is changed by the clutch to the direct-coupled mode with respect to the input gear, the output gear is rotated synchronously with the input gear. The direct-coupled mode is employed for the operation mode in which the speed at which the magnetic tape travels is not regulated by the capstan shaft, i.e., the fast forward or fast rewind mode. The loading motor for driving the brake and loading a magnetic tape is employed as a drive source for displacing a mode lever to a position consonant with the operating mode. The position for driving the brake and the position for tape loading are allocated for the mode lever.

According to the invention, when the switching unit selects the first path in the direct-coupled mode, the fast forward mode is designated for the magnetic tape.

Based on the detection signal received from the end sensor that has detected the tape end during the operation in the fast forward mode, the capstan motor is rotated in reverse while the clutch is maintained in the direct-coupled mode. Then, the switching unit selects the second path to halt the feeding rotation of the supply reel table, and the supply reel table is reversely rotated through the switching unit in the take-up direction for a specific period of time. Thereafter, the capstan motor is halted and the rotation of the loading motor is started to halt the take-up reel table by the brake. In conjunction with the braking timing, the clutch is changed to the slide rotation mode.

According to this configuration, as well as the previously explained configuration that was disclosed in conventional example 2, when the end sensor detects the tape end in the fast forward mode; the capstan motor starts rotate in reverse and the switching unit is shifted toward the second path. Therefore, the output gear of the switching unit engages with the gear provided on the supply reel table, and immediately halts the idling rotation of the supply reel table. As a result, the quick brake system employed for conventional example 1 is not required, and the time period from the detection by the end sensor of the tape end and until the rotation of the supply reel table is halted by the switching unit can be shorter than the time period required to use the quick break method to stop the supply reel table, and the immediate halting of the supply reel table is enabled.

Furthermore, according to this invention, since the idling rotation of the supply reel table is immediately prevented and, for a continuous period, the supply reel table is then rotated via the switching unit in the take-up direction. Therefore, after the immediate halting of the supply reel table, loosen of the magnetic tape, due to the previously described magnetic tape discharging phenomenon, seldom occurs at the take-up reel table.

The supply reel table, which has been halted, is then rotated in reverse via the switching unit in the take-up direction for a constant period and thereafter, the capstan motor is halted while the rotation of the loading motor is started to break the take-up reel table using the brake, and in conjunction with the timing for this braking, the clutch is changed to the slide rotation mode. With this configuration, after the capstan motor has been halted, loosen of the magnetic tape due to the magnetic tape discharging phenomenon seldom occurs at the take-up reel table, and the operating mode can be smoothly shifted to the recording/ reproducing mode at normal speed.

The invention can also employ a configuration wherein the switching unit includes the input gear, the output gear, and an idler gear that engages with the output gear, wherein the idler gear is moved forward or in reverse around the output gear between a first position, whereat the idler gear engages with a first gear for rotating the take-up reel table, and a second position, whereat the idler gear engages with a second gear for rotating the supply reel table. Furthermore, the invention employs another configuration wherein the clutch includes a main gear for constantly engaging with the output gear, and a switching gear displaced between an engagement position and a disengagement position relative to the input gear.

This invention can be realized by adopting the following configuration. A braking device for a magnetic tape apparatus including: a switching unit for, as a rotational direction of a capstan motor is changed, selecting a first path along which a rotation of the capstan motor is transmitted through gears to a take-up reel table or a second path along which the rotation of the capstan motor is transmitted through gears to a supply reel table, the switching unit including a clutch having an output gear that transmits the rotation to the take-up reel table or to the supply reel table, the clutch switching the output gear between a slide rotation mode and a direct-coupled mode with respect to an input gear connected to the capstan motor; a brake for breaking the take-up reel table; a loading motor for driving the brake and loading a magnetic tape; and an end sensor for detecting a tape end of the magnetic tape, wherein, when the switching unit selects the first path in the direct-coupled mode, the fast forward mode is designated wherein, based on a detection signal received from the end sensor that has detected the tape end during the operation in the fast forward mode, the capstan motor is rotated in reverse while the clutch is maintained in the direct-coupled mode, then, the switching unit selects the second path to halt a feeding rotation of the supply reel table, and the supply reel table is reversely rotated through the switching unit in a take-up direction for a predetermined period of time, and thereafter, the capstan motor is halted and the rotation of the loading motor is started to halt the take-up reel table by the brake, and in conjunction with the braking timing, the clutch is changed to the slide rotation mode, wherein the switching unit includes the input gear, the output gear, and an idler gear that engages with the output gear, the idler gear is moved forward or in reverse around the output gear between a first position, whereat the idler gear engages with a first gear for rotating the take-up reel table, and a second position, whereat the idler gear engages with a second gear for rotating the supply reel table, wherein the clutch includes a main gear for constantly engaging with the output gear, and a switching gear displaced between an engagement position and a disengagement position relative to the input gear, and wherein between the engagement position and the disengagement position the switching gear is displaced by a mode lever that is displaced by the rotation of the loading motor.

DETAILED DESCRIPTION OF THE PREFERRED EMBODIMENTS

Figure 1:
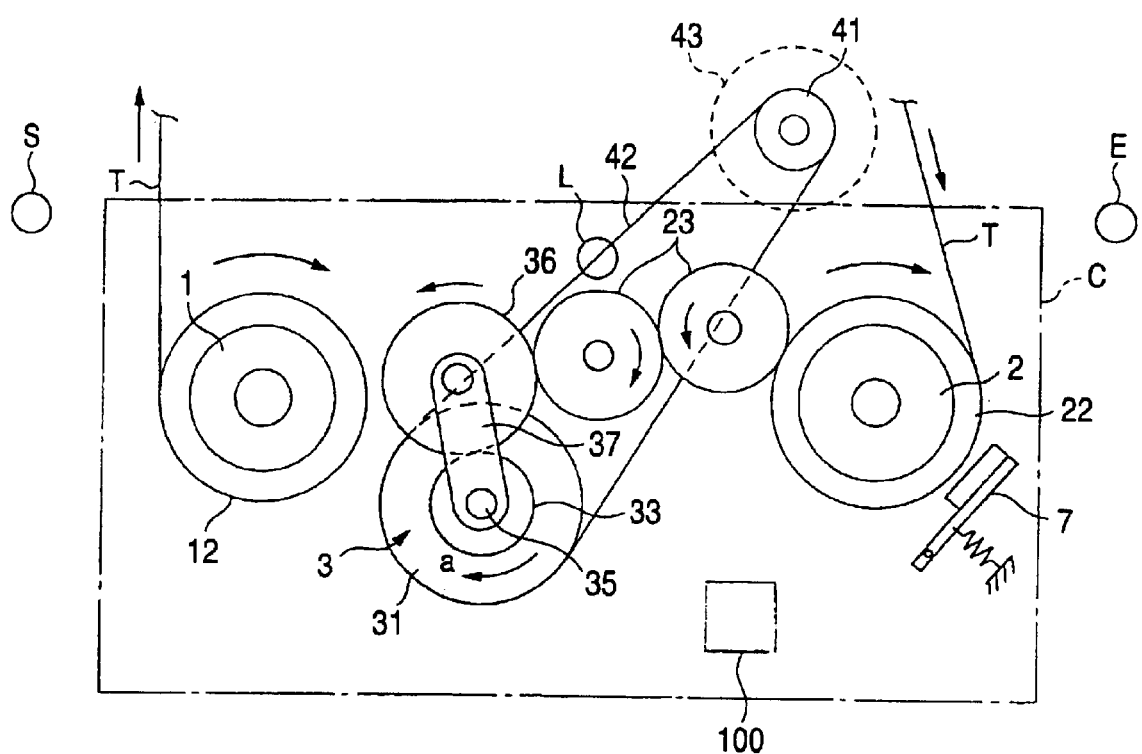
FIG. 1 is a schematic plan view showing a braking device for a magnetic tape apparatus according to one embodiment of the present invention, during an operation in a fast forward mode.
Figure 2:
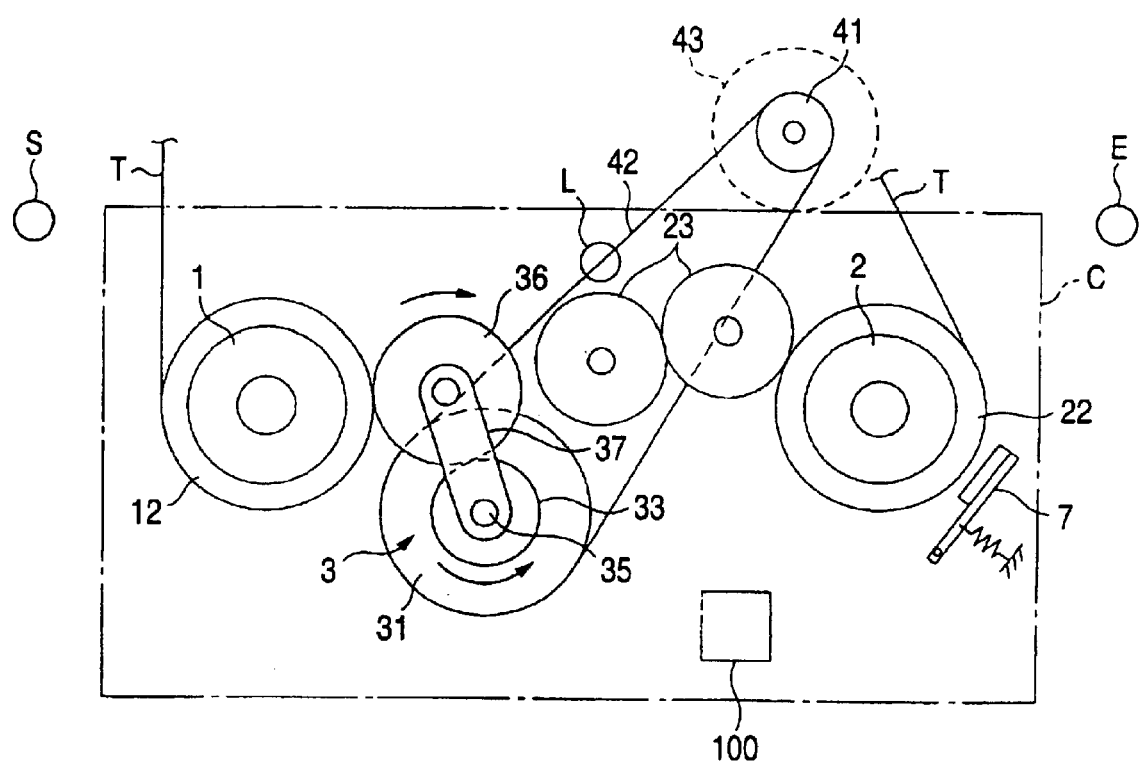
FIG. 2 is a schematic plan view showing a braking operation conducted by the braking device.
Figure 3:
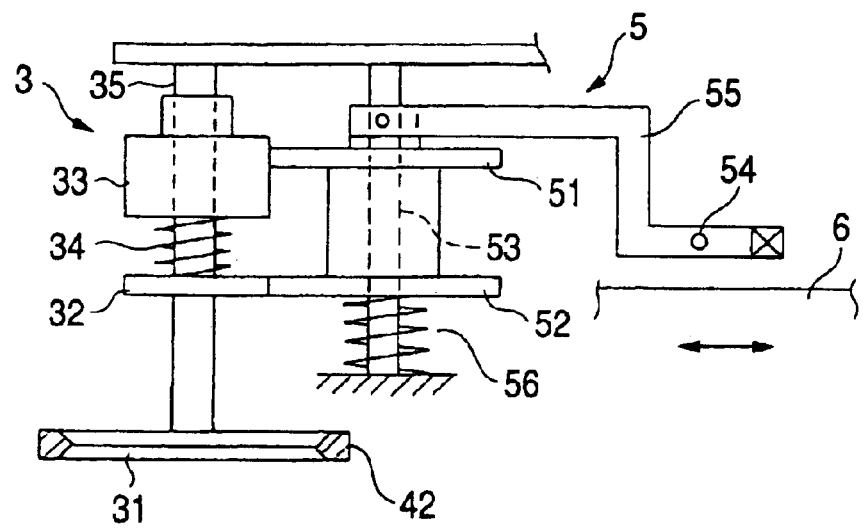
FIG. 3 is a diagram showing a direct-coupled rotation mode of a switching unit.
Figure 4:
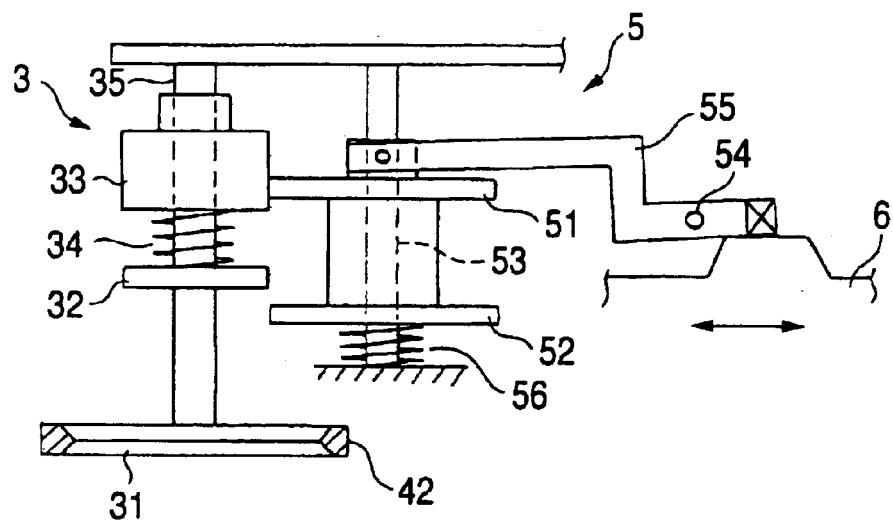
FIG. 4 is a diagram showing a slide rotation mode of the switching unit.
Figure 5:
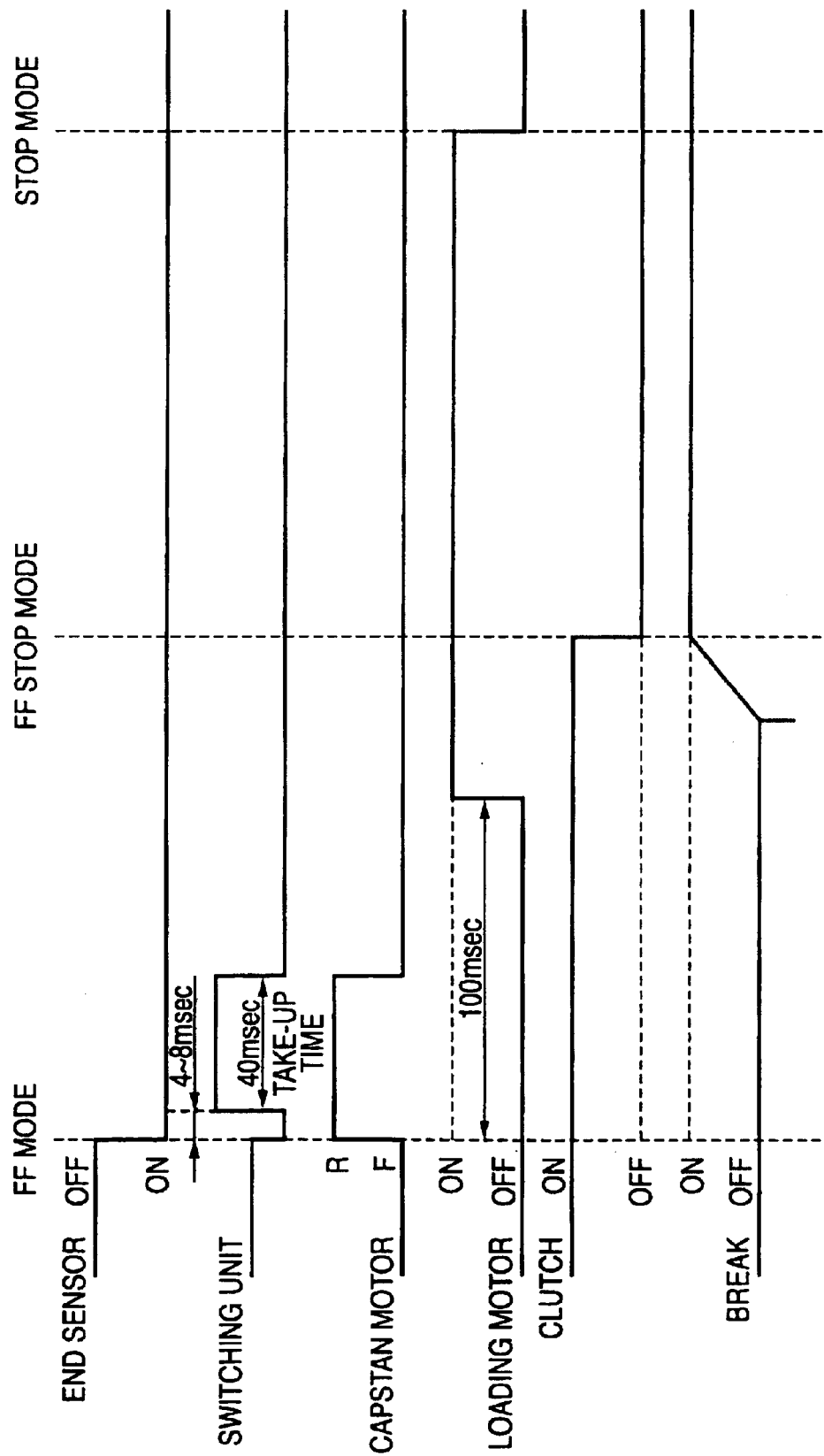
FIG. 5 is a diagram presented as a time chart.

FIG. 1 is a schematic plan view of a braking device for a magnetic tape apparatus according to one embodiment of the present invention when a fast forward mode is executed. FIG. 2 is a schematic plan view for explaining a braking operation conducted by the braking device. FIG. 3 is a diagram for explaining a direct-coupled rotation mode of a switching unit 3. FIG. 4 is a diagram showing a slide rotation mode of the switching unit 3. FIG. 5 is a diagram presented as a time chart.

In FIG. 1, a braking device includes a supply reel table 1, a take-up reel table 2 and a switching unit 3. Gears 12 and 22 are respectively provided coaxially with the supply reel table 1 and the take-up reel table 2. A gear train 23 having a predetermined number of gears always engages with the gear 22 of the take-up reel table 2. A controller 100 such as CPU controls the operation of the breaking device.

The switching unit 3 includes a pulley 31, and a belt 42 fitted around the pulley 31 and an output pulley 41 of a capstan motor 43. Further, as is shown in FIGS. 3 and 4, the switching unit 3 also includes an input gear 32 and an output gear 33 coaxial with the pulley 31. The input gear 32 is always rotated with the pulley 31 at the same speed and in the same direction, while the output gear 33 is rotated against a predetermined friction resistance applied by a spring 34. That is, when a specific rotational load is imposed on the output gear 33, in accordance with the rotational load, the output gear 33 is rotated slower than the pulley 31 and the input gear 32. In addition, as is shown in FIGS. 1 and 2, the switching unit 3 also includes an idler gear 36, which always engages with the output gear 33. A link 37 supports the idler gear 36 and maintains the engagement of the idler gear 36 with the output gear 33.

As shown in FIGS. 3 and 4, a clutch 5 is provided to selectively change the output gear 33 of the switching unit 3 either to a slide rotation mode or a direct-coupled rotation mode. The clutch 5 includes: a main gear 51, which always engages with the thick output gear 33; and a switching gear 52, which can be displaced between an engagement position and a disengagement position relative to the input gear 32. In the example shown in FIGS. 3 and 4, the main gear 51 and the switching gear 52 are integrally formed of a synthetic resin and are both slidably fitted around a support shaft 53 for displacement in the axial direction. A control lever 55 is pivotally supported by a lateral shaft 54, while one end thereof is coupled with the main gear 51 and the other end is positioned facing a mode lever 6. A spring 56 continuously urges the switching gear 52 toward a position whereat the switching gear engages with the input gear 32.

As is shown in FIG. 4, the mode lever 6 includes an angle cam for applying pressure to the facing end of the control lever 55 against the urging force of the spring 56. This mode lever 6 can be displaced to a position whereat it drives a brake 7 shown in FIGS. 1 and 2, and to a tape loading position, or other positions for various operating modes, by a loading motor (not shown) provided as a driving source for this displacement.

The operation of the braking device will now be described.

When a tape cassette C is set and a supply reel and a take-up reel of the tape cassette C are held at the supply reel table 1 and the take-up reel table 2, the loading motor starts loading the magnetic tape T, and winds the magnetic tape T around a magnetic head rotation cylinder (not shown).

During the recording/reproducing mode, performed at normal speed, the end of the control lever 55 of the clutch 5 is driven upward by the angle cam of the mode lever 6 as shown in FIG. 4, separating the switching gear 52 from the input gear 32. Thus, the output gear 33 of the switching unit 3 is set in the slide rotation mode.

On the other hand, in the fast forward or fast rewind mode, as is shown in FIG. 3, the end of the control lever 55 of the clutch 5 is depressed by the force exerted by the spring 56, and the switching gear 52 engages with the input gear 32, so that the output gear 33 of the switching unit 3 is set to the direct-coupled rotation mode.

When the fast forward mode is selected in the direct-coupled rotation mode, as is shown in FIG. 1, the input gear of the switching unit 3 is rotated clockwise direction a, and the link 37 is moved to the right to engage the idler gear 36 with the gear train 23. Thus, the switching unit 3 selects a first path, and the rotation of the capstan motor is transmitted to the take-up reel table 2.

An explanation will now be given mainly referring to FIGS. 2 and 5, for the operation performed when an end sensor E detects the tape end during an operation performed in the fast forward mode. Reference sign L designates a light source, and reference sign S designates a start sensor. Above the light source, a prism (not shown) is disposed to split light emitted from the light source toward the end sensor E and the start sensor S. The end sensor E and the start sensor S detect light emitted from the light source L.

When the end sensor detects the tape end and is changed from the OFF state to the ON state, an instruction is issued for changing to the reverse direction (R) the rotational direction of the capstan motor, while the direct-coupled mode of the clutch 5 is maintained, as shown in FIG. 3 (the direct-coupled mode is not canceled). Thus, after a specific period of time (4 to 8 msec) has elapsed, the idler gear 36 of the switching unit engages with the gear 12 of the supply reel table 1 as shown in FIG. 2. As a result, the switching unit 3 selects a second path, and the rotation of the capstan motor is transmitted to the supply reel table 1.

During a period continuing until the switching unit 3 changes the first path to the second path, the supply reel table 1 is idly rotated forward. However, since the rotating idler gear 36 engages with the gear 12 of the supply reel table 1, the idling rotation of the supply reel table 1 is momentarily stopped, and immediately thereafter, the supply reel table 1 is reversely rotated in the take-up direction. Therefore, loosening of the magnetic tape T that occurs during the idling rotation of the supply reel table 1 can be eliminated. The period required for the switching unit 3 to change from the first to the second path is shorter than the period required by the previously described quick brake method. Further, since the direct-coupled rotation mode of the switching unit 3 continues to be selected by the clutch 5, the supply reel table 1 is stopped without the output torque being lost, and the required period of time, from the detection of the tape end until the idling rotation of the supply reel table 1 is halted, can be reduced. Therefore, a phenomenon seldom occurs in which the boundary between the tape end and the leader reaches the magnetic head rotation cylinder and adversely affects the magnetic head.

When the supply reel table 1 is rotated in reverse by the idler gear 36 in the take-up direction for a specific period of time (40 msec), an instruction is issued to halt the capstan motor, and upon the reception of this instruction, the capstan motor is stopped.

When the supply reel table 1 is momentarily halted in the above-described manner, no load is imposed on the take-up reel table 2, so that the magnetic tape wound on the take-up reel table 2 may go back. To prevent this problem, the loading motor is started for breaking the take-up reel table 2 using the brake 7, and in conjunction with the timing for this braking, the clutch 5 is changed to the slide rotation mode and the operating mode is shifted to the stop mode. As a result, after the capstan motor has been halted, the tape is not loosen due to the going back of the magnetic tape from the take-up reel table 2, and the operating mode can be smoothly shifted to the recording/reproducing mode at normal speed. In this embodiment, the time period from the tape end detection to the initiation of the rotation of the loading motor is set at 100 msec.

As was described above, according to the present invention, when the tape end is detected during an operation in the fast forward mode, the rotation of the supply reel table is immediately halted by engaging gears, and the travel of the magnetic tape can be stopped before the boundary between the tape end and the leader reaches the magnetic head rotation cylinder. Therefore, a phenomenon in which the leader damages the magnetic head seldom occurs.

Furthermore, after the supply reel table has been halted quickly, loosening of the magnetic tape due to the tape discharging phenomenon at the take-up reel table can be prevented, and the operating mode can be smoothly shifted to the recording/reproducing mode at normal speed.

Further, since the quick brake method is not required, the number of parts and the manufacturing costs can be reduced.

What is claimed is:

1. A braking device for a magnetic tape apparatus comprising:
    a switching unit for, as a rotational direction of a capstan motor is changed, selecting a first path along which a rotation of the capstan motor is transmitted through gears to a take-up reel table or a second path along which the rotation of the capstan motor is transmitted through gears to a supply reel table, the switching unit including a clutch having an output gear that transmits the rotation to the take-up reel table or to the supply reel table, the clutch switching the output gear between a slide rotation mode and a direct-coupled mode with respect to an input gear connected to the capstan motor;
    a brake for braking the take-up reel table;
    a loading motor for driving the brake and loading a magnetic tape; and
    an end sensor for detecting a tape end of the magnetic tape,
    wherein, when the switching unit selects the first path in the direct-coupled mode, a fast forward mode is designated,
    wherein, based on a detection signal received from the end sensor that has detected the tape end during the operation in the fast forward mode, the capstan motor is rotated in reverse while the clutch is maintained in the direct-coupled mode, then, the switching unit selects the second path to halt a feeding rotation of the supply reel table, and the supply reel table is reversely rotated through the switching unit in a take-up direction for a predetermined period of time, and thereafter, the capstan motor is halted and the rotation of the loading motor is started to halt the take-up reel table by the brake, and in conjunction with the braking timing, the clutch is changed to the slide rotation mode,
    wherein the switching unit includes the input gear, the output gear, and an idler gear that engages with the output gear, the idler gear is moved forward or in reverse around the output gear between a first position, whereat the idler gear engages with a first gear for rotating the take-up reel table, and a second position, whereat the idler gear engages with a second gear for rotating the supply reel table,
    wherein the clutch includes a main gear for constantly engaging with the output gear, and a switching gear displaced between an engagement position and a disengagement position relative to the input gear, and
    wherein between the engagement position and the disengagement position the switching gear is displaced by a mode lever that is displaced by the rotation of the loading motor.

2. A braking device for a magnetic tape apparatus comprising:
    a switching unit for, as a rotational direction of a capstan motor is changed, selecting a first path along which a rotation of the capstan motor is transmitted through gears to a take-up reel table or a second path along which the rotation of the capstan motor is transmitted through gears to a supply reel table, the switching unit including a clutch having an output gear that transmits the rotation to the take-up reel table or to the supply reel table, the clutch switching the output gear between a slide rotation mode and a direct-coupled mode with respect to an input gear connected to the capstan motor;
    a brake for braking the take-up reel table;
    a loading motor for driving the brake and loading a magnetic tape; and
    an end sensor for detecting a tape end of the magnetic tape,
    wherein, when the switching unit selects the first path in the direct-coupled mode, a fast forward mode is designated, and
    wherein, based on a detection signal received from the end sensor that has detected the tape end during the operation in the fast forward mode, the capstan motor is rotated in reverse while the clutch is maintained in the direct-coupled mode, then, the switching unit selects the second path to halt a feeding rotation of the supply reel table, and the supply reel table is reversely rotated through the switching unit in a take-up direction for a predetermined period of time, and thereafter, the capstan motor is halted and the rotation of the loading motor is started to halt the take-up reel table by the brake, and in conjunction with the braking timing, the clutch is changed to the slide rotation mode.

3. The braking device according to claim 2, wherein the switching unit includes the input gear, the output gear, and an idler gear that engages with the output gear, the idler gear is moved forward or in reverse around the output gear between a first position, whereat the idler gear engages with a first gear for rotating the take-up reel table, and a second position, whereat the idler gear engages with a second gear for rotating the supply reel table.

4. The braking device according to claim 3, wherein the clutch includes a main gear for constantly engaging with the output gear, and a switching gear displaced between an engagement position and a disengagement position relative to the input gear.

* * * * *